Oct. 4, 1927.  1,644,005
C. H. AU
CURRENT METER
Filed Oct. 17, 1925  2 Sheets-Sheet 2
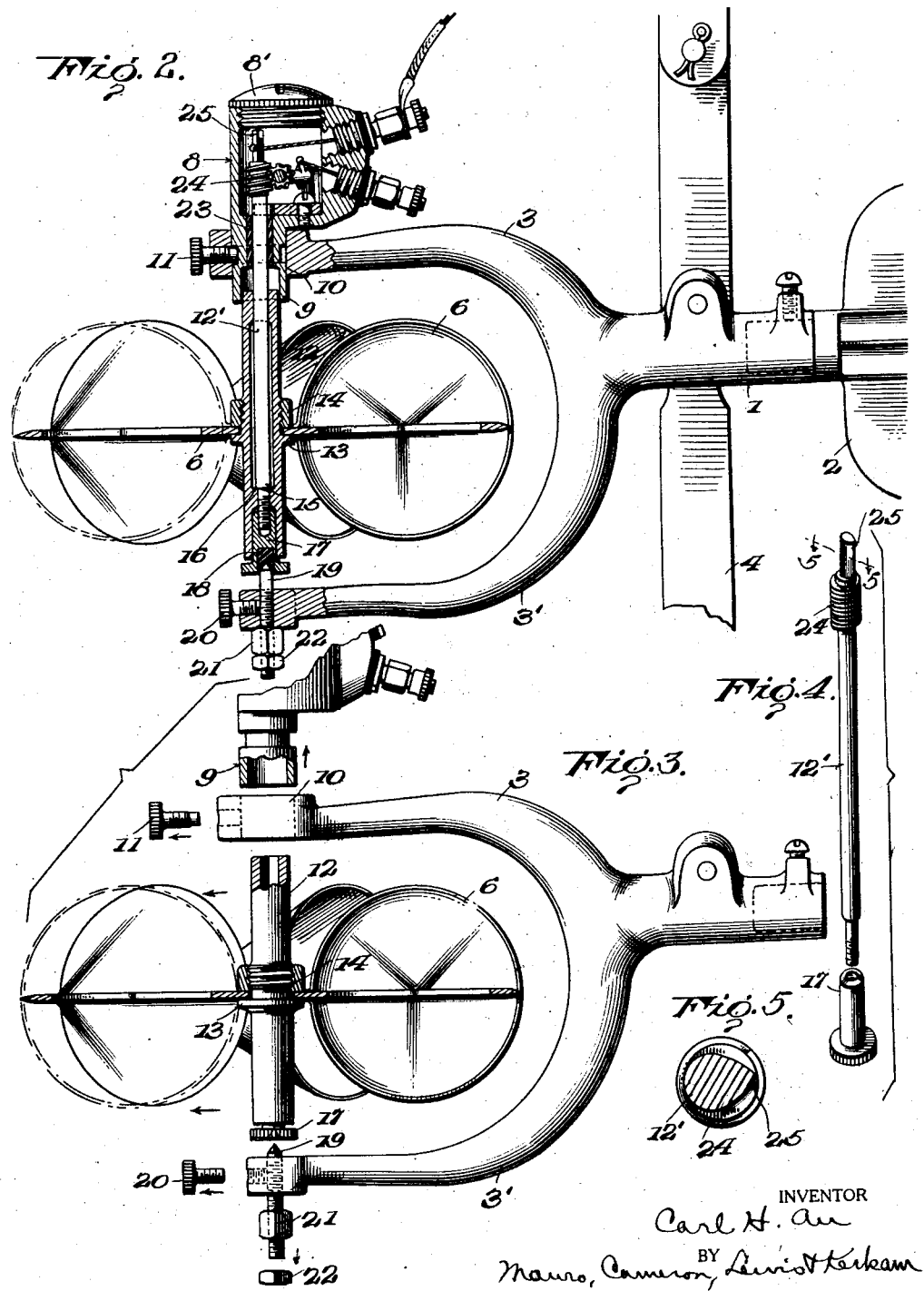
INVENTOR
Carl H. Au
BY
Mauro, Cameron, Lewis & Kerkam
ATTORNEYS Patented Oct. 4, 1927.

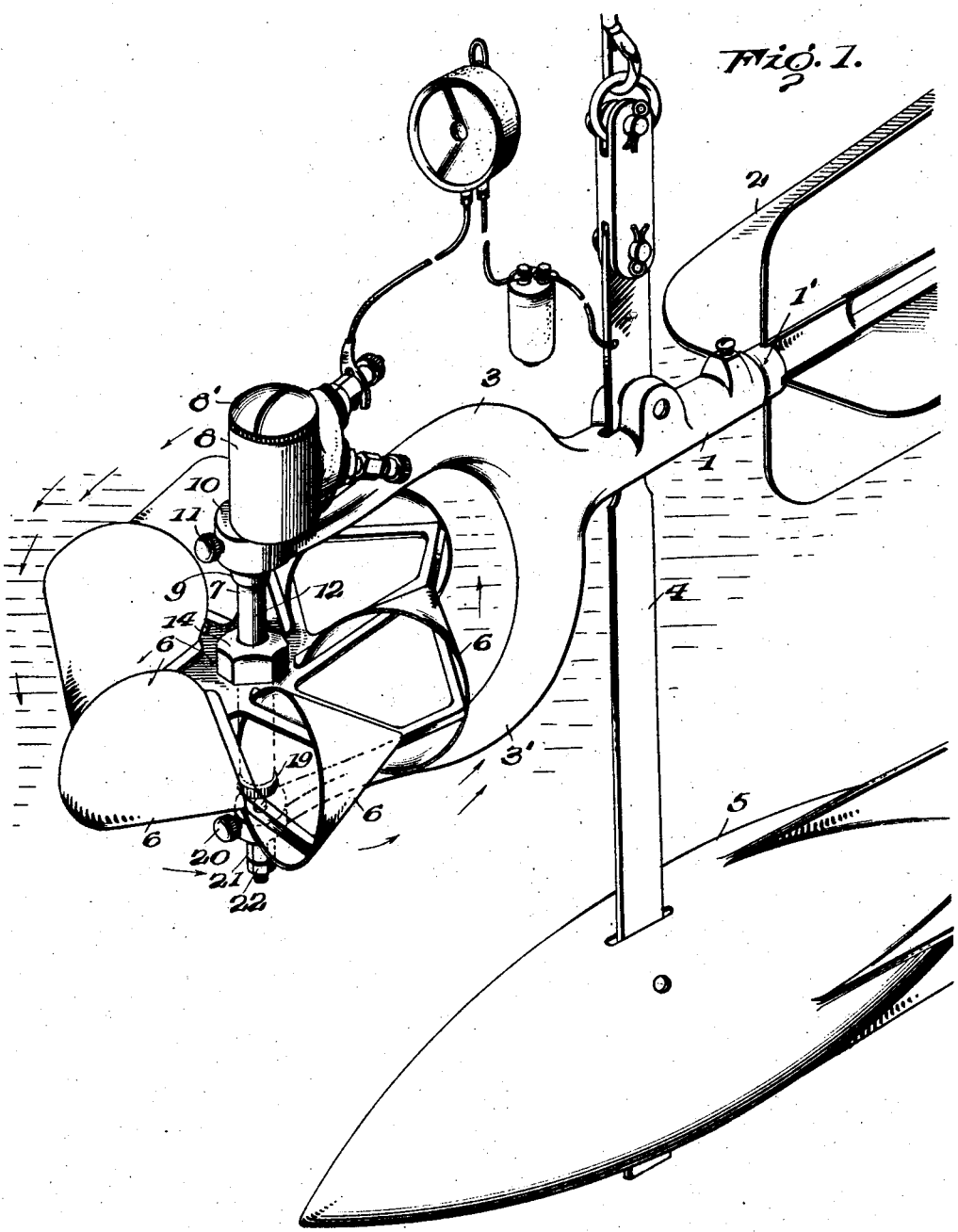

1,644,005

UNITED STATES PATENT OFFICE.

CARL H. AU, OF WASHINGTON, DISTRICT OF COLUMBIA, ASSIGNOR OF ONE-HALF TO JOHN C. HOYT, OF WASHINGTON, DISTRICT OF COLUMBIA.

CURRENT METER.

Application filed October 17, 1925. Serial No. 63,089.

This invention relates to current meters and more particularly to current meters of the so-called "cup-wheel" type, in which the cup-wheel, as it is driven by a fluid current of air, water or the like, revolves a shaft mounted in a yoke, one arm of which carries a contact chamber into which the end of the shaft projects and effects a make-and-break contact with a brush forming a part of an electric circuit, the make-and-break of the circuit being effected either directly through the contact and break of contact of the brush with the shaft, or through make-and-break contact with a secondary shaft driven thereby.

These instruments have to function with great accuracy, with minimum of friction and, by reason of the fact that they are frequently used in dirty streams filled with sediment, have to be disassembled and all the parts thoroughly cleaned. This is particularly true of the cup-wheel shaft and cup-wheel. It is also desirable to have the parts so constructed that they can be packed in a small space for transportation.

It is an object of the present invention to provide a current meter of the type indicated, in which the cup-wheel and the main shaft driven thereby can be quickly and readily assembled and disassembled without special tools and by an unskilled person.

It is a further object to provide in a current meter a cup-wheel shaft which may be driven with a low degree of friction and in which the bearings for the shaft are protected from an accumulation of foreign matter which would increase friction.

With these objects in view, the invention consists in a cup-driven shaft so constructed and arranged with relation to the other parts that the shaft and the wheel thereon may be quickly and readily removed and replaced in position by the simple operation of a couple of set screws and the disjointing of a screw-threaded portion of the shaft, all without the use of any tools whatever. The invention further consists of a shaft of the kind indicated provided with removable bearings, one of which is so constructed as to exclude dirt from the bearing, and the other of which is of an inverted cup-shaped form, to the end that any sediment or other foreign matter will fall away from rather than settle upon the bearing.

The invention further consists in certain specific details of construction and arrangement of parts as will hereinafter more fully appear.

The inventive idea involved is capable of receiving a variety of mechanical expressions, one of which for the purpose of illustrating the invention is shown in the accompanying drawings, but it is to be expressly understood that these drawings are for the purpose of illustration only and are not designed to define the limits of the invention, reference being had to the appended claims for this purpose.

In said drawings

Fig. 1 is a perspective view of the current meter as a whole.

Fig. 2 is a side elevation of the meter with the main shaft and contact chamber and the ends of the yoke in section, parts, however, being shown in elevation.

Fig. 3 is a side elevation, with parts shown in section, showing the manner of removing the cup-wheel and shaft from the meter.

Fig. 4 is a side elevational view of a portion of the shaft.

Fig. 5 is an enlarged cross section on the line 5—5 Fig. 4.

Referring to the drawings in which like reference numerals indicate like parts throughout the several views, 1 indicates a shaft having at one end a tail piece 2 removably secured thereto and at the other end a yoke composed of the arms 3, 3'. Passing through the shaft 1 is a suitable staff 4 on the lower end of which is secured a weight 5. A cup-wheel 6 is mounted on a shaft 7 supported in the outer ends of the arms 3, 3' of the yoke. Preferably, and as here shown, the cup-wheel 6 is so mounted that its central horizontal plane is below the shaft 1. All of these parts may be of the usual or of any suitable preferred construction, except the shaft 7 which latter is constructed and mounted as follows.

Referring to Figs. 2, 3 and 4, 8 is a contact chamber substantially cylindrical in cross section and having a downwardly projecting hollow arm 9, by means of which said chamber is mounted in an opening 10, formed in the upper arm 3 of the yoke, the same being held in position by set screw 11. The main shaft is of compound construction. The part 12 is in the form of a hollow sleeve having an annular flange 13 thereon, upon which flange the cup-wheel 6 rests and against which it is secured by a nut 14 screw-threaded upon the part 12. The downwardly projecting part of the hollow arm 9 receives the upper end of the hollow portion 12 of the shaft, but without making contact therewith. Extending through the hollow part 12 of the shaft, is a rod 12'. This rod 12' has a shoulder 15 formed on its lower end portion which engages a corresponding shoulder 16 of the hollow portion 12, and the lower projecting end portion of the rod 12' is screw-threaded to receive a nut 17 extending into the lower end of the sleeve 12, in which nut portion is secured a hardened cup-bearing 18, which rests on a pointed pivot bearing 19, held in the lower arm 3' of the yoke, as by a set screw 20. The member 19 extends through the yoke arm 3 and below the same and is threaded to receive a nut 21 and a locknut 22. The upper end of the rod 12" takes bearing in a hardened steel bearing sleeve located in the downwardly projecting arm of the contact chamber, and said rod portion 12' has a worm 24 formed on the portion thereof projecting within the chamber. Above the worm said shaft has a radially projecting rib 25.

To disassemble the parts, the set screws 11 and 20 are loosened, see Fig. 3, the bearing point 19 withdrawn, the nut 17, forming part of the main shaft, unscrewed from the lower end of the rod 12' and the contact chamber 8 together with the rod 12' is then withdrawn, as shown in Fig. 3, leaving the hollow portion 12 of the shaft with the cup-wheel 6 attached thereto, when it can be readily removed. If it is desired to also take out the rod 12', this can be accomplished by simply unscrewing the cap 8' and withdrawing the rod through the top of the contact chamber 8.

It will be observed that all of the operations either in assembling or disassembling the parts as above described, may be effected without the use of any tools other than an ordinary screw driver and that the same may be accomplished without any particular mechanical skill.

Moreover, it will be apparent that the tendency of dirt to collect in the cup-shaped bearing at the bottom of the shaft will be largely reduced by reason of the inverted character of said bearing and that the bearing at the upper part of the shaft will be freed from dirt or other foreign matter by reason of the entrance of the upper portion of the sleeve 12 into the downwardly projecting portion 9 of the contact chamber.

It will be readily appreciated, by those skilled in the art, that the inventive idea illustrated in the accompanying drawings may be embodied in other forms than that herein shown without in any way departing from the spirit of the invention, and all such forms are intended to be included in the accompanying claims.

What is claimed is:

1. In a current meter, the combination of a shaft comprising a sleeve and a shouldered rod passing through said sleeve with its shoulder held against a corresponding shoulder in the sleeve, a yoke, bearings for said shaft removably supported one in each arm of said yoke, and a cup-wheel secured to said shaft.

2. In a current meter, the combination of a yoke, a contact chamber carried by one arm of said yoke, a projection on said chamber extending downward through said arm, an annular bearing in said projection, a conical bearing point carried by the other yoke arm, a sleeve having an interiorly extending shoulder, a rod screw-threaded at its lower end and having a shoulder engaging the shoulder in the sleeve with its upper end projecting therefrom and through said annular bearing, a nut threaded on the lower end of said rod and locking the rod and sleeve together, and a bearing socket on said nut and engaged by said conical bearing point.

3. In a current meter, the combination of a two-armed yoke and a cup-wheel shaft taking bearing in the arms of said yoke, said shaft comprising a sleeve, a rod locked within said sleeve with one end projecting therefrom, and a hardened bearing socket secured to the other end thereof.

4. In a current meter, the combination of a two-armed yoke and a cup-wheel shaft taking bearing in the arms of said yoke, said shaft comprising a sleeve having an interiorly projecting shoulder, a rod in said sleeve with its upper end projecting therefrom, said rod having a shoulder engaging the shoulder in the sleeve and a screw-threaded end projecting below said shoulder and within the sleeve, and a nut on said screw-threaded end and having a portion with a bearing socket extending outside the sleeve.

5. In a current meter, a compound shaft comprising a sleeve, a rod extending into said sleeve but with one end projecting therefrom, means securing the other end within the sleeve, and an inverted cup bearing on said means.

In testimony whereof I have signed this specification.

CARL H. AU